United States Patent Office 3,419,616
Patented Dec. 31, 1968

3,419,616
PREPARATION OF NINHYDRIN
Louis L. Wood, Washington, D.C., assignor to W. R. Grace & Co., New York, N.Y., a corporation of Connecticut
No Drawing. Filed Aug. 22, 1966, Ser. No. 573,847
5 Claims. (Cl. 260—590)

ABSTRACT OF THE DISCLOSURE

In abstract, this invention is directed to a process for preparing ninhydrin, comprising reacting a mixture of oximino-1,3-indandione, formaldehyde and aqueous acid and recovering the ninhydrin formed thereby, all as recited hereinafter.

---

The present invention relates to the synthesis of ninhydrin, and more specifically to an improved process by which ninhydrin may be economically prepared from a 1,3-indandione.

It has been suggested that ninhydrin, i.e. 1,2,3-indantrione hydrate may be prepared by reacting 1,3-indandione with selenium dioxide in the presence of dioxane and water. This process is of interest in that it makes use of the relatively inexpensive 1,3-indandione intermediate. However, from a commercial standpoint this synthesis is not attractive due to the expenses of the selenium dioxide.

It is therefore an object of the present invention to provide an improved method for producing ninhydrin from 1,3-indandione.

It is another object to provide an improved method for preparing 2-oximino-1,3-indandione from 1,3-indandione which in turn may be readily converted into ninhydrin.

It is yet another object to provide a method by which 2-oximino-1,3-indandione may be efficiently and economically converted to ninhydrin.

These and still further objects of the present invention will become readily apparent to one skilled in the art from the following detailed description and specific examples.

Broadly, I have found that ninhydrin may be readily obtained from 1,3-indandione if the 1,3-indandione is first converted to 2-oximino-1,3-indandione, which in turn is readily converted to ninhydrin by the novel procedure set forth herein.

More specifically, the present invention contemplates a novel procedure for preparing ninhydrin which comprises the following individually novel steps:

(1) Reacting 1,3-indandione with an aqueous solution of sodium nitrite and mineral acid to obtain substantially quantitative yields of 2-oximino-1,3-indandione, and (2) Reacting 2-oximino-1,3-indandione with an aqueous solution of formaldehyde and mineral acid to obtain ninhydrin.

The steps of the overall reaction occuring in the present invention may be outlined by the following equations:

Step 1

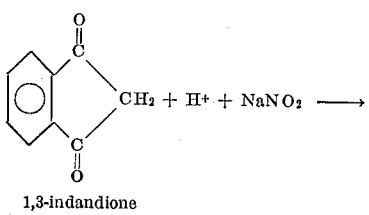

1,3-indandione

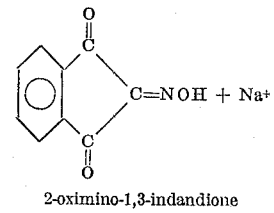

2-oximino-1,3-indandione

Step 2

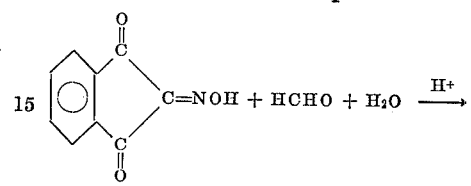

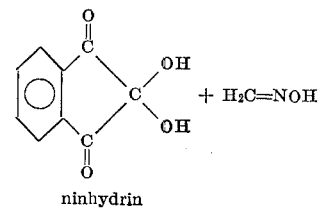

ninhydrin

Step 1 of the above reaction is preferably conducted by first preparing a slurry of 1,3-indandione in an aqueous acid solution. Then an aqueous solution of sodium nitrite is slowly added to the 1,3-indandione slurry with constant stirring. During the course of the reaction, 2-oximino-1,3-indandione forms and may be readily collected from the reaction media by filtration.

The above reaction wherein the 1,3-indandione is converted to the 2-oximino derivative is preferably conducted at a temperature from about −10° C. to about 100° C. At these specified temperatures the reaction is found to be substantially complete in from about 1 to about 60 minutes. Acids used to form the aqueous reaction media may be sulfuric acid, hydrochloric acid, phosphoric, acetic, formic, etc. The reaction media preferably contains from about 0.01 to about 18 equivalents of acid per liter of solution. Preferably from about .5 to about 5 liters of aqueous solution is used per mole of 1,3-indandione present in the reaction mixture.

The 2-oximino-1,3-indandione product which forms during the course of the reaction is not soluble in the reaction mixture and hence may be readily removed therefrom by filtration, decantation, or other suitable recovery procedures known to those skilled in the art.

In step 2 of the above reaction, 2-oximino-1,3-indandione, such as recovered from step 1, is mixed with an aqueous solution of formaldehyde and acid and is reacted until a homogenous solution is formed. The homogenous solution may then be concentrated by evaporation to obtain a precipitate of ninhydrin.

The above reaction wherein the 2-oximino-1,3-indandione is converted to ninhydrin is preferably conducted at a temperature from about 0 to about 100° C. At this temperature from about 10 to about 1200 minutes are required to achieve substantially complete reaction.

The aqueous solution which contains formalehyde and acid preferably comprises from about 1 to about 10 moles of formaldehyde and from about 1 to about 10 moles of acid per liter of water. The formaldehyde used in the present reaction may be the standard aqueous formaldehyde of commerce which contains 37.5 percent formaldehyde. Acids used in the preparation of the reactant solution may be hydrochloric acid, sulfuric acid, and phosphoric acid.

The aqueous formaldehyde acid solution used in the reaction with 2-oximino-1,3-indandione is preferably used in amounts varying from about 0.5 to about 10 liters of aqueous solution per mole of 2-oximino-1,3-indandione reacted therewith.

Subsequent to reaction the resultant solution is preferably evaporated to about 10 percent of the original volume. This causes precipitation of the desired ninhydrin product which may be then recovered by filtration and subjected to subsequent purification procedures such as crystallization from suitable solvents such as 0.01 N-hydrochloric acid, water and ethyl ether.

Having described the basic aspects of the present invention the following examples are given to illustrate the specific embodiments thereof:

Example I

A slurry comprising 4.5 grams of 1,3-indandione and 15 ml. of water containing 2.0 grams of concentrated sulfuric acid was stirred at 25° C. for 30 minutes while a solution comprising 2.1 grams of sodium nitrite in 20 ml. of water was added dropwise. The slurry gradually turned from a buff color to yellow. After 40 minutes, the yellow solid was collected by filtration and washed with 10 to 20 ml. water. Drying the yellow solid at 50° C. and 30 mm. Hg vacuum for 8 hours gave 5.05 grams (93.5% yield) of 2-oximino-1,3-indandione having a melting point of 204–208° C.

Example II

A slurry comprising 1.75 g. of 2-oximino-1,3-indandione in 4 ml. of 37% aqueous formaldehyde and 8 ml. of 37.5% hydrochloric acid was stirred at 25° C. for three hours. Within a period of about 1 to 5 hours the slurry became a homogenous solution. After three hours the solution was diluted with 15 to 20 ml. of water whereupon traces of solid were precipitated. The solid was filtered off and the resultant clear solution was evaporated to about 10% volume whereupon ninhydrin having a melting point of from about 238 to about 243° C. was recovered.

Example III

A slurry comprising 1 mole of 1,3-indandione in 500 ml. of water containing about 1.50 moles of sulfuric acid was prepared. To this slurry which was maintained at about 25° C. was added over a 30 minute period an aqueous solution containing 2 moles of sodium nitrite and 200 ml. of water. The mixture was stirred for about 2 hours whereupon a solid yellow precipitate was formed which was 2-oximino-1,3-indandione. This product was removed by filtration and weighed about 166 grams which indicated a 95% yield based on the original 1,3-indandione used.

Example IV

A slurry comprising 1.75 parts by weight of 2-oximino-1,3-indandione and 4.45 parts by weight of aqueous formaldehyde and 9.5 parts by weight of 37.5% hydrochloric acid was stirred at room temperature for 3 hours. Resulting clear solution is diluted with an equal volume of water and the small solids which were precipitated were removed by filtration. The filtrate which at that point contained the ninhydrin product dissolved in a solution of water, hydrogen chloride, formaldehyde sulfoxylate ($NaOSOCH_2OH$) for a period of about 60 minutes at 25° C. A water soluble product which was found to be hydrindantin was recovered. The hydrindantin yield was found to be 90% based on the 2-oximino-1,3-indandione initially present. This example clearly shows that the ninhydrin formed by present novel method may be readily converted to hydrindantin.

The above examples clearly show that the present method provides an improved procedure for obtaining substantial yields of ninhydrin from 1,3-indandione.

I claim:
1. A method for preparing ninhydrin which comprises reacting a mixture of oximino-1,3-indandione, formaldehyde and aqueous acid and recovering the ninhydrin formed thereby.
2. A method of claim 1 conducted at temperature from about 20 to 30° C.
3. A method of claim 1 wherein said formaldehyde is present in 2–5 fold excess over that required to react with said oximino-1,3-indandione.
4. The method of claim 1 wherein said aqueous acid is selected from the group consisting of hydrochloric acid, sulfuric, phosphoric, acetic and formic.
5. A method of claim 4 wherein said aqueous acid solution contains from about one to about 10 equivalents of acid per liter of water.

References Cited

Teeters et al., J. Am. Chem. Soc. 55, 3026–3028 (1933).
Mustafa et al., J. Am. Chem. Soc. 76, 124–127 (1954).

DANIEL D. HORWITZ, *Primary Examiner.*

U.S. Cl. X.R.
260—566